United States Patent [19]

Abrjutin et al.

[11] 4,362,560

[45] Dec. 7, 1982

[54] PROCESS FOR PRODUCING HIGH-PURITY GALLIUM

[76] Inventors: Vladimir N. Abrjutin, ulitsa V. Maslovka, 7, kv. 63, Moscow; Vyacheslav P. Ezhkov, ulitsa Lenina, 47, kv. 73, Svetlovodsk Kirovogradskoi oblasti; Raisa V. Ivanova, ulitsa Udaltsova, 14, kv. 181, Moscow; Oleg N. Kalashnik, ulitsa Lenina, 53, kv. 87; Vyacheslav A. Kirichenko, ulitsa Lenina, 37, kv. 53, both of Svetlovodsk Kirovogradskoi oblasti; Alexandr V. Peredereev, M. Filevskaya ulitsa 40, kv. 25, Moscow; Jury G. Pukhov, ulitsa Boguna, 9, kv. 36, Svetlovodsk Kirovogradskoi oblasti; Arkady A. Belsky, Komsomolsky prospekt, 48/22, kv. 20, Moscow; Vladimir V. Kozhemyakin, Sovetsky prospekt, 13, kv. 52, Ivanteevka Moskovskoi oblasti; Galina E. Masjuk, ulitsa Egorova, 17, kv. 3, Svetlovodsk Kirovogradskoi oblasti, all of U.S.S.R.

[21] Appl. No.: 211,441

[22] Filed: Nov. 28, 1980

[51] Int. Cl.$^3$ .................. C22B 7/00; C22B 30/04; C22B 58/00
[52] U.S. Cl. ........................................ 75/63; 75/84; 75/111
[58] Field of Search ................... 75/84, 63

[56] References Cited

U.S. PATENT DOCUMENTS

| | | | |
|---|---|---|---|
| 2,927,853 | 3/1960 | Merkel | 75/84 |
| 3,166,405 | 1/1965 | Kulifay | 75/63 |
| 3,512,958 | 5/1970 | Yokozawa et al. | 75/63 |
| 4,097,267 | 6/1978 | Baccaro et al. | 75/134 P |

*Primary Examiner*—M. J. Andrews
*Attorney, Agent, or Firm*—McAulay, Fields, Fisher, Goldstein & Nissen

[57] ABSTRACT

A process for producing high-purity gallium from gallium-arsenic containing wastes resulting from the manufacture of semiconductors which comprises a vacuum-thermal decomposition of said wastes under a residual pressure of from $1.10^{-1}$ to $1.10^{-2}$ mm Hg while elevating temperature to from 25° to 1,150° C. at variable heating rates ranging from 0.5° to 20° C./min. The vacuum-thermal decomposition of the wastes is accompanied by sublimation of arsenic which is condensed. The resulting melt of gallium is cooled to a temperature of from 50° to 100° C. at variable cooling rates ranging from 0.05° to 15° C./min. Then the melt of gallium is filtered at the cooling temperature of the melt. The filtered gallium melt is subjected to a hydrochemical treatment. The melt of gallium having passed the hydrochemical treatment is subjected to a fractional multistage crystallization to crystallize gallium in an amount of from 60 to 95% by mass of its initial charge in each stage; the metal residues enriched with impurities are recycled from each subsequent stage to each preceding one.

7 Claims, No Drawings

PROCESS FOR PRODUCING HIGH-PURITY GALLIUM

The present invention relates to the metallurgy of rare metals and, more specifically, to processes for producing high-purity gallium.

FIELD OF THE INVENTION

At present gallium finds an extensive use in industry. Thus, it is employed for coating optical surfaces. Gallium alloys are employed as a working body in radiation circuits, thermoregulators, high-temperature thermometers, liquid current collectors in electric machines, as well as solders in soldering and bonding different materials. Gallium is also employed in medicine as a component of a tooth-filling material in dentistry.

The main consumer of high-purity gallium is electronic engineering, wherein it is used for doping germanium and silicon. High-purity gallium is also employed in the manufacture of semiconductor compounds of the type $A^{III}B^{V}$ used in the production of light diodes for various displays and indicating devices of computers, electronic watches, and the like. Since the main consumer of gallium at present is semiconductor electronics which imposes especially strict requirements on the purity of gallium, technologists are faced with the problem of developing such purification methods which would make it possible to obtain gallium with the content of the basic substance of 99.999–99.99999% (by mass) and higher.

At the same time, an important problem being tackled in numerous industrially developed countries is the search for new sources of gallium in order to compensate shortage of this metal. For this reason, the importance of such new source of gallium as gallium-arsenic-containing wastes resulting from the semiconductor manufacture with the content of the valuable component of up to 50% cannot be underestimated. According to the procedure of manufacturing semiconductor materials, gallium-arsenic wastes can be subdivided into the following categories: lump wastes-residues in crucibles, discarded single crystals, polycrystals; grinding powders formed in cutting of single crystals; grinding powders with an abrasive, formed in polishing of plates; metallic gallium obtained from the processes of epitaxial growing of layers of semiconductor materials; plates after physical measurements; discarded semiconductor instruments, and the like.

It is a specific feature of all these categories of wastes a high content of a whole range of impurities: zinc, tellurium, tin, indium, aluminum, silicon, and the like, with a concentration of from n $10^{-3}$ to 1–2% by weight (where n is 1 to 9), whereby the procedure of recovering gallium and subsequent refining thereof to a high-purity metal becomes substantially complicated.

In the art of gallium refining, from among the known methods of purification of metals from dopes, use is made of filtration, hydrochemical and vacuum treatment, electrolysis and crystallization. These methods enable elimination of various dopes from gallium, though each individual method cannot ensure the production of the metal of grades 5N–7N. Thus, filtration techniques enable the removal of impurities from gallium, contained in an amount exceeding their solubility limit in gallium.

With the hydrochemical treatment it is possible to remove impurities which are positioned to the left from hydrogen in the electromotive series. These elements can be exemplified by alkali metals, aluminum, zinc, and some others.

In electrolysis which is generally conducted under the conditions of anodic dissolution of the starting metal and cathodic recovery of the purified metal, gallium is purified from a great number of impurities which are more electronegative than gallium in the electromotive series.

Crystallization techniques which are widely employed in the purification of metals including directional crystallization, zone melting or crystal growing by the Chokhral'sky method are used for purification of gallium from impurities whose effective distribution coefficient substantially differs from 1.

BACKGROUND OF THE INVENTION

Currently known are several processes for producing high-purity gallium from gallium-arsenic-containing wastes resulting from the manufacture of semiconductors, namely: process of vacuum-thermal decomposition; hydride process; electrochemical, nitride and oxidation processes. Thus, in practising the nitride process (cf. R. V. Ivanova et al. "Electronic Engineering", ser. 14, issue 2) gallium arsenide wastes are treated with ammonia at high temperatures. The resulting solid metal nitrides are subjected to an acidic treatment using, for example, hydrochloric acid, whereafter the resulting solutions containing the impurities are removed and the remaining gallium nitride is decomposed by means of an alkali, while gallium is recovered from the resulting solutions by electrolysis.

The recovered gallium after electrorefining is delivered to a crystallization purification effected by conventional techniques. The resulting metal corresponds to grade 5N. This process features a complicated flow sheet and cannot be applied to all types of wastes resulting from the manufacture of semiconductors.

In another known process (R. V. Ivanova "Electronic Engineering", ser. 14, issue 2, page 113) gallium arsenide wastes are oxidized with chlorine, giving gallium chlorides and arsenic chlorides. After separation of the chlorides, the resulting gallium chloride is subjected to a two-stage rectification and hydrolysis with dissolution of the resulting gallium hydrates in the alkali. From the resulting solutions gallium is recovered by electrolysis, whereafter crystallization purification is effected by the known methods such as Chokhral'sky method, zone recrystallization method.

Gallium produced by this process corresponds to grade 5N. The use of this process is limited due to aggressiveness of the resulting chlorides of gallium and arsenic, and due to the use of highly-toxic chlorine.

Also known is another process for producing high-purity gallium from thermally decomposable gallium compounds such as gallium arsenide (cf. GDR Patents Nos. 120,861 and 186,969). The process resides in vacuum-thermal decomposition of the compounds. To this end, they are placed into a silica reactor and heated to a temperature above 1,000° C. under a residual pressure of below $10^{-1}$ mm Hg. The duration of the heat-treatment is 2 hours. The process is accompanied by sublimation of arsenic which is then condensed. As a result, a melt is produced which is subjected to cooling. The cooled melt is withdrawn from the reactor.

The cooled melt is filtered and the filtered melt is subjected to a hydrochemical treatment with hydrochloric acid, followed by washing gallium with water.

The resulting gallium has a purity of 99.999% by mass. This process does not ensure purification of gallium from difficultly-volatile impurities such as tin, indium, and is unsuitable for processing all types of wastes from the manufacture of semiconductors, in particular, grinding powders, discarded semiconductor circuits.

In still another prior art process (R. V. Ivanova "Electronics Engineering", ser. 14, issue 2, p.109) gallium arsenide wastes are subjected to vacuum-thermal decomposition at the temperature of 1,050° C. and under a residual pressure of about $10^{-2}$ mm Hg. At this stage the content of arsenic in gallium is below $1.10^{-4}\%$ by weight. The resulting melt of metallic gallium after cooling is filtered off, while the slime remaining after the filtration is fed to the stage of vacuum-thermal decomposition. The filtered-off melt is subjected to a hydrochemical treatment with nitric acid, hydrochloric acid and water. The metal after the hydrochemical treatment is subjected, successively, to electrochemical refining in an alkaline electrolyte and crystallization purification by conventional techniques. The resulting gallium corresponds to grade 5N.

This process is also applicable only to certain types of wastes resulting from the manufacture of semiconductors, for example lump wastes of gallium arsenide. Furthermore, the process features a relatively sophisticated flow-sheet.

Application of the process of electrolytical refining lowers the productivity of high-purity gallium manufacture. On the whole, it necessitates the use of expensive reagents (electrolytic refining of gallium is effected in an alkaline electrolyte, followed by the removal of traces of the electrolyte from gallium by means of a solution of hydrochloric acid).

SUMMARY OF THE INVENTION

It is an object of the present invention to provide such a process for producing high-purity gallium from gallium-arsenic-containing wastes resulting from the manufacture of semiconductors, which would make it possible to obtain the metal with the content of the main substance of 99.99999% by mass by following a simple procedure applicable to all kinds of wastes from the manufacture of semiconductors.

These and other objects are accomplished by a process for producing high-purity gallium from gallium-arsenic-containing wastes resulting from the manufacture of semiconductors, involving vacuum-thermal decomposition of the wastes under a residual pressure of from $1.10^{-1}$ to $1.10^{-2}$ mm Hg accompanied by sublimation of arsenic and condensation thereof, cooling of the resulting gallium melt, filtration thereof and a hydrochemical treatment of the filtered gallium melt, followed by purifying crystallization of the gallium melt after the hydrochemical treatment, wherein in accordance with the present invention said vacuum-thermal decomposition of gallium-arsenic-containing wastes is effected by raising the temperature from 25° to 1,150° C. at variable rates within the range of from 0.5° to 20° C./min, cooling of the resulting gallium melt is effected to a temperature of from 50° to 100° C. at variable rates selected within the range of from 0.05° to 15° C./min; filtration of the melt is effected at the cooling temperature of the gallium melt and the purifying crystallization of the gallium melt having passed the hydrochemical treatment is effected by way of a fractional multi-stage crystallization of this gallium melt with crystallization of gallium in an amount of from 60 to 95% by mass based on the starting charge at each stage, the metal residues rich in impurities are delivered from each preceding stage to each subsequent stage.

As the gallium-arsenic-containing wastes resulting from the manufacture of semiconductors use can be made of all kinds of such wastes such as: lump-like wastes, grinding powders, return gallium, plates after physical measurements, discarded semiconductor instruments. These wastes contain a great number of more readily volatile (compared to gallium impurities such as lead, tellurium, zinc in an amount of from $n.10^{-3}$ to $n.10^{-4}\%$ by weight, where n is 1 to 9, and hardly volatile impurities such as tin, indium, silicon, aluminum and the like in an amount of from $n.10^{-3}$ to 1% by weight, where n is 1 to 9. The choice of the conditions of the vacuum-thermal decomposition and the subsequent cooling of the melt is defined by the type of the processed wastes, nature and content of impurities in the starting stock.

Thus, in the case of lump-like wastes of gallium arsenide containing impurities of tellurium and tin, the process of vacuum-thermal decomposition of the wastes should be preferably carried out from 25° to 1,150° C. at variable rates of heating of from 0.5° to 20° C./min, while cooling of the melt is effected at variable rates of lowering temperature of from 0.05° to 15° C./min to a temperature of from 50° to 100° C. This ensures sublimation and condensation of arsenic and the removal of tellurium and tin.

The process of filtration of the melt of gallium is conducted at a temperature within the range of from 50° to 1,000° C. which is defined by physico-chemical characteristics of the impurities being present in the melt. The lower temperature limit is defined by the conditions of the formation of aggregated particles, e.g. intermetallides in the system gallium-impurity readily removable in the filtration stage. The upper temperature limit is defined by the possibility of the additional recovery of gallium due to overheating of the melt being filtered.

The process of the fractional purifying crystallization is effected in a number of stages in an apparatus with an increased productivity in such a manner that gallium is crystallized to 60-95% by mass based on the starting charge in each stage, the metal residues enriched with impurities are delivered to each preceding stage from each subsequent stage. The amount of the crystallized metal of from 60 to 95% by mass in each stage is defined by the nature and content of the impurities in metallic gallium. The percentage of crystallization of the metal melt is increased from the first towards the subsequent stages. Thus, if the content of impurities in the starting metal is at the level of $n.10^{-2}$ to $n.10^{-3}$ (by mass), wherein n is 1 to 9, then in the 1-st stage there is crystallized 60 to 80% of the melt and in the second and subsequent stages there is crystallized 80-95%.

The process of fractional crystallization should be preferably conducted in 2 to 5 stages. The number of stages is defined depending on the content of impurities in the starting metal delivered to the stage of crystallization and the required degree of purification. The critical is the apparent coefficient of distribution of impurities in gallium, the values of which in this process is within the range of from 0.1 to 0.001.

Thus, in the case of an increased content of copper in the starting gallium supplied to the stage of crystallization with the apparent coefficient of this copper impurity of about 0.1, the number of stages of crystallization should be equal to 5. In the case of impurities of tin, silver having this coefficient of about 0.001, it is possible to use only two stages of crystallization.

The process of vacuum-thermal decomposition of gallium-arsenic-containing wastes resulting from the manufacture of semi-conductors should be preferably conducted in the following manner: at a temperature of from 25° to 900° C. heating at a rate of 5° to 20° C. min, then at a temperature of from 900° to 1,100° C. heating at a rate of from 0.5° to 10° C./min and then at a temperature of from 1,100° to 1,150° C. at a heating rate of from 5° to 20° C./min. The choice of heating rates within the above-specified temperature ranges is defined by the necessity of a uniform heating of the charged wastes and provision of conditions for maintaining pressure below the atmospheric in the working space so as to ensure a uniform rate of evaporation and condensation of arsenic and readily-volatile impurities.

The process of melt cooling should be performed in the following manner: initial cooling of the melt to a temperature of from 300° to 500° C. at a rate of from 0.05° to 15° C./min then to a temperature of from 50° to 100° C. at a rate of from 0.5° to 15° C./min. The choice of the melt cooling rates is defined by the conditions of the formation of intermetallic compounds in the system gallium-arsenic-hardly volatile impurity.

As it has been already mentioned hereinbefore, the process according to the present invention is applicable to all kinds of wastes resulting from the manufacture of semiconductors. Certain types of wastes such as plates of gallium arsenide after physical measurements, some kinds of discarded semiconductor instruments contain metallic impurities in the form of solders, contacts, coatings. For the removal thereof it is advisable to subject the wastes, prior to the vacuum-thermal decomposition, to a hydrochemical treatment with an aqueous solution of hydrochloric acid in the presence of an oxidizing agent, followed by washing with water. Afterwards, the wastes are dried at a temperature within the range of from 120° to 160° C. As the oxidizing agent it is preferable to make use of nitric acid or hydrogen peroxide.

The process for producing high-purity gallium from gallium-arsenic-containing wastes resulting from the manufacture of semiconductors is a versatile one, since it makes possible to selectively recover those elements of the periodic system that are contained in the waste and ensures processing of all kinds of gallium-arsenic-containing wastes from the semiconductor manufacture.

The carrying-out of the processes of vacuum-thermal decomposition and the subsequent cooling of the melt at variable rates of heating and cooling enables a noticeable intensification of the process and increase in the degree of gallium recovery.

Filtration of the melt of gallium at a temperature of from 50° to 100° C. makes it possible to lower losses of the metal due to additional recovery of gallium from the melt.

The process according to the present invention ensures the production of gallium of the purity grades of 99.9999–99.99999% from the starting stock containing impurities in an amount of from $1\text{-}n.10^{-4}\%$ by weight where n is 1 to 9. The yield of high-purity gallium is equal to 89–96% of the content of gallium in the starting feedstock.

The process for producing high-purity gallium from gallium-arsenic-containing wastes of the semiconductor manufacture according to the present invention necessitates no such labour-consuming and costly operations as electrolytical refining, thus substantially simplifying the procedure for the production of high-purity gallium and, furthermore, makes it possible to increase the product output by 5 to 15 times.

Detailed Description of the Invention

The process for producing high-purity gallium from gallium-arsenic-containing wastes resulting from the manufacture of semiconductors is simple and can be effected in the following manner.

The starting gallium-arsenic-containing wastes resulting from the manufacture of semiconductors are charged into a graphite crucible which is then placed into a furnace. In the furnace there is a condenser for condensation of arsenic and readily-volatile impurities. The furnace is closed and a reduced pressure is created therein to the residual one of $1\times 10^{-1}\text{-}1\times 10^{-2}$ mm Hg. Thereafter, by means of an electric-resistance heater the furnace is heated to the temperature of 1,150° C. at variable rates. In doing so, it is advisable to use variable heating grades of from 5° to 20° C./min for the temperature range of from 25° to 900° C., of from 0.5° to 10° C./min for the temperature range of from 900° to 1,100° C. and from 5° to 20° C./min for the temperature range of from 1,100° to 1,150° C. During heating there occurs the decomposition of the wastes accompanied by sublimation of arsenic and the impurities which are condensed. As a result, a melt is formed which is cooled to a temperature of from 50° to 100° C. at variable cooling rates. It is advisable to cool the melt at first to a temperature of from 300° to 500° C. at a variable rate of from 0.05° to 15° C./min and then to cool to a temperature of from 50° to 100° C. at a variable rate of from 0.5° to 15° C./min. On completion of the cooling process the furnace is opened and the crucible is extracted therefrom. The degree of recovery of gallium is more than 80%, the content of arsenic being equal, depending on the selected process conditions, to $n.10^{-5}\%$ by weight, wherein n is 2 to 5. The resulting melt is filtered through porous filtering members. The filtered melt is delivered to a hydrochemical treatment which is performed by conventional methods, while the slime after filtration is fed to the stage of vacuum-thermal decomposition of the wastes. The filtered-off melt is charged into a vessel made of a material inert relative to gallium and provided with a stirrer. The melt is heated, by means of a heater, to a temperature of from 50° to 90° C. Thereafter a solution of nitric acid preheated to this temperature is charged into the vessel. The stirrer is switched on and the treatment is conducted for 15 to 30 minutes. Then the spent nitric acid is discharged and deionized water preheated to a temperature of from 50° to 90° C. is charged into the vessel. After washing of gallium with water to remove traces of nitric acid, a solution of hydrochloric acid is charged into the vessel and gallium is treated following the above-described procedure.

When no impurities of aluminum and other dopes oxidizing under the effect of nitric acid are present in the melt of gallium, the hydrochemical treatment is conducted using only hydrochloric acid solution under the same conditions. In some cases, when certain impurities are present in the melt of gallium, it is preferable to use a solution of nitric acid for the hydrochemical treatment.

The gallium melt after the hydrochemical treatment is fed to purifying crystallization. The fractional multistage crystallization of the gallium melt is effected in an apparatus with a developed seeding surface area, thus ensuring a high efficiency of the process. Depending on the nature and content of impurities in the melt, the process is conducted in 2–5 stages with crystallization of 60–95% by mass of gallium based on the starting charge in every stage. The residue enriched with the impurities from every subsequent stage is delivered to the preceding stage, while the gallium melt being purified is delivered to the subsequent stages of the purifying crystallization. The residue after the first stage of the purifying crystallization is subjected to filtration, hydrochemical treatment and electrolytic refining. The expenses associated with the electrical refining of the residue from the first stage of the purifying crystallization are insignificant.

As it has been already mentioned hereinabove, in the processing of certain types of gallium-arsenic-containing wastes these are subjected to a preliminary hydrochemical treatment. To this end, the wastes are placed into a quartz vessel, poured with an aqueous solution of hydrochloric acid so that the solution of hydrochloric acid would cover the surface of the wastes. Hydrogen peroxide or a solution of nitric acid is gradually added and the treatment of the wastes is conducted for a period of from 15 to 30 minutes. Then the treated solution is drained and the wastes are washed with distilled water, whereafter these are dried at a temperature of from 120° to 160° C.

For a better understanding of the present invention, some specific examples are given hereinbelow by way of illustration.

EXAMPLE 1

Lump wastes of gallium arsenide with the content of tin of $1\frac{3}{8}$%, indium-$2.10^{-1}$% by weight, aluminum-$2.10^{-3}$% by weight are placed into a graphite crucible which is put into a furnace provided with a condenser. The charge weight is 6 kg. In the chamber a reduced pressure of $1.10^{-2}$ mm Hg is created and the wastes are heated to the temperature of 900° C. at a variable rate of from 10° to 15° C./min, then to the temperature of 1,100° C. at a variable rate of from 0.8° to 10° C./min and further to the temperature of 1,150° C. at a variable rate of from 5° to 10° C./min. Under these conditions there occurs sublimation of arsenic and its condensation. The resulting gallium melt is cooled at a variable rate of from 0.05° to 0.08° C./min to the temperature of 450° C., whereafter the cooling rate is increased to 10°–15° C./min and the cooling of the melt is effected to the temperature of 60° C. After cooling the furnace is opened. In the condenser there is 95% of arsenic (based on its initial amount), the degree of recovery of gallium is 87%. Then the melt of gallium is subjected to filtration through a porous quartz plate at the temperature of 60° C. The slime from the filter is delivered to the stage of a vacuum-thermal decomposition of the wastes. The content of impurities in the melt of gallium after filtration is: tin-$3.10^{-3}$% by weight, indium-$2.10^{-2}$% by weight, that of aluminum and arsenic is $8.10^{-5}$ and $2.10^{-5}$% by weight respectively. The filtered melt is placed into a vessel made of a material inactive in respect of gallium and provided with a stirring device. The melt is heated, by means of a heater, to the temperature of 70° C. Thereafter, a solution of nitric acid preheated to the temperature of 70° C. is charged into the vessel and the stirrer is switched on. The treatment time is 15 minutes. The spent nitric acid is drained and deionized water preheated to the temperature of 80° C. is supplied into the vessel. After washing of the melt with water to remove traces of nitric acid which is checked by the neutral reaction of the indicator, a solution of hydrochloric acid is charged into the vessel and the melt treatment is effected as described hereinabove. The content of the impurities is as follows: tin-$2.10^{-3}$% by weight, indium-$8.10^{-3}$% by weight, aluminum-$2.10^{-5}$% by weight. Then the resulting metallic gallium is subjected to a 3-stage fractional crystallization. The process is conducted at the crystallization rate of 50 g/min to the crystallization of 70% by mass of the starting gallium melt supplied to every stage of crystallization. The residue after the 1st stage of crystallization is subjected to a hydrochemical treatment and subsequent electrochemical refining. The metal residues enriched with the impurities are delivered from every subsequent stage to every preceding stage.

The content of impurities in the final product is as follows: tin-$6.10^{-6}$% by weight, indium-$1.10^{-6}$% by weight, aluminum-$6.10^{-6}$% by weight.

EXAMPLE 2

Grinding powders of gallium arsenide without abrasive and with the content of: copper-$5.10^{-3}$% by weight, zinc-$5.10^{-2}$% by weight, tin-$8.10^{-4}$% by weight, silicon-$1.10^{-3}$% by weight, aluminum $1.10^{-1}$% by weight, are charged into a graphite crucible which is put into a furnace provided with a condenser. The charge weight is 8 kg. The reduced pressure of $1.10^{-1}$ mm Hg is created in the chamber and the wastes are heated to the temperature of 900° C. at variable rates of from 5° to 10° C./min, then to the temperature of 1,100° C. at a variable rate of from 5° to 10° C./min and further to the temperature of 1,150° C. at a variable rate of from 10° to 12° C./min. The resulting gallium melt is cooled at a variable rate of from 10° to 15° C./min to the temperature of 300° C., whereafter the cooling rate is lowered to 0.5°–1.0° C./min and the process of the melt cooling is effected to the temperature of 50° C. After cooling the furnace is opened. In the condenser there are present 98% of arsenic (based on the initial amount thereof). The degree of recovery of gallium is 90%. Then the melt of gallium is subjected to filtration through a porous quartz plate at the temperature of 50° C. The slime from the filter is supplied to the stage of vacuum-thermal decomposition of the wastes. The content of impurities in the melt of gallium after filtration is as follows: copper-$4.10^{-3}$% by weight, zinc-$1.10^{-3}$% by weight, tin-$1.10^{-4}$% by weight, silicon-$1.10^{-3}$% by weight, aluminum-$2.10^{-3}$% by weight, arsenic-$2.10^{-5}$% by weight. The filtered melt is subjected to a hydrochemical treatment following the procedure described in Example 1, except that the treatment temperature is 60° C. The content of the impurities is as follows: copper-$4.10^{-3}$% by weight, zinc-$5.10^{-5}$% by weight, tin-$1.10^{-4}$% by weight, silicon-$8.10^{-4}$% by weight, aluminum-$4.10^{-5}$% by weight. Then the resulting metallic gallium is subjected to a 2-stage fractional crystallization. The process is carried out at the crystallization rate of 40° C./min till the crystallization of 95% of the melt by mass gallium based on its initial amount in the melt supplied to each stage of crystallization. The residue after the first crystallization stage is subjected to filtration and hydrochemical treatment.

The residue enriched with the impurities after the second stage is delivered to the first stage of crystallization. The content of impurities in the final product is as follows: copper-not detected; zinc-$1.10^{-6}$% by weight, tin-$4.10^{-6}$% by weight, silicon-$2.10^{-5}$% by weight, aluminum-$6.10^{-6}$% by weight.

EXAMPLE 3

Grinding powders of gallium arsenide with an abrasive and the content of: copper $2.10^{-1}$% by weight, zinc-$1.10^{-1}$% by weight, tin-1% by weight, aluminum-1% by weight are placed into a graphite crucible which is put into a furnace provided with a condenser. The charge weight is 8 kg. The reduced pressure of $3.10^{-2}$ m Hg is created in the chamber an the wastes are heated to the temperature of 900° C. at a variable rate of from 5° to 10° C./min, then to the temperature of 1,100° C. at a variable rate of from 0.5° to 8° C./min and further to 1,150° C. at a variable heating rate of from 15° to 20° C./min. Under these conditions there occurs sublimation of arsenic along with its condensation. The resulting gallium melt is cooled at a variable rate of from 1° to 5° C./min to the temperature of 500° C., whereafter the cooling rate is increased to 8°–12° C./min and the melt cooling process is conducted until the temperature of 100° C. is reached. After cooling the furnace is opened. In the condenser there are 91% of arsenic (based on the initial amount), the degree of recovery of gallium is 81%. Then the melt of gallium is subjected to filtration through a porous quartz plate at the temperature of 100° C. The slime from the filter is delivered to the stage of a vacuum-thermal decomposition of wastes. The content of the impurities in the melt of gallium after filtration is as follows: copper-$3.10^{-1}$% by weight, zinc-$3.10^{-3}$% by weight, tin-$5.10^{-3}$% by weight, aluminum-$3.10^{-4}$% by weight, arsenic-$3.10^{-5}$% by weight. The filtered melt is subjected to a hydrochemical treatment following the procedure described in the foregoing Example 1, except that the treatment temperature is 90° C. The content of the impurities is as follows: copper-$2.10^{-2}$% by weight, zinc-$6.10^{-5}$% by weight, tin-$5.10^{-3}$% by weight, aluminum-$2.10^{-5}$% by weight. Then the resulting metallic gallium is subjected to a 5-staged fractional crystallization. The process is conducted as the crystallization rate of 55 g/min to the degree of crystallization of 60% by mass of the starting melt of gallium delivered to each stage of crystallization.

The residue after the first stage of crystallization then undergoes filtration and hydrochemical treatment. The metal residues enriched with the impurities are fed from each subsequent stage to the preceding stage. The content of impurities in the final product is as follows: copper-$2.10^{-7}$% by weight, zinc-$1.10^{-6}$% by weight, tin-$4.10^{-6}$% by weight and aluminum-$6.10^{-6}$% by weight.

EXAMPLE 4

Plates of gallium arsenide with an indium-tin solder deposited thereon (the waste product is obtained after measurements of electrophysical parameters of semiconductor material) are placed into a quartz vessel and poured with an aqueous solution of hydrochloric acid in the volumetric ratio of the acid to water of 1:1. The amount of the employed solution is taken so that the surface of the wastes is covered with this solution. Then into the vessel hydrogen peroxide is gradually added and the treatment process is conducted for 15 minutes. Then the spent solution is drained and the wastes are washed with distilled water, whereafter they are dried at the temperature of 160° C.

The plates of gallium arsenide after their hydrochemical treatment contain: copper-$1.10^{-3}$% by weight, iron-$1.10^{-3}$% by weight, tin-$5.10^{-3}$% by weight; these plates are put into a graphite crucible which is placed into a furnace provided with a condenser. The charge weight is 7 kg.

The reduced pressure of $3.10^{-2}$ mm Hg is created in the chamber and the wastes are heated to the temperature of 800° C. at a variable rate of from 15° to 20° C./min, then to the temperature of 1,100° C. at a variable rate of from 0.5° to 1° C./min and further to the temperature of 1,150° C. at a variable rate of from 8° to 12° C./min. Under these conditions there occur sublimation and condensation of arsenic. The resulting melt of gallium is cooled at a variable rate of from 9° to 15° C./min to the temperature of 70° C. After cooling the furnace is opened. In the condenser there are 94% of arsenic (based on its initial amount), the degree of recovery of gallium is 92%. Then the melt of gallium is subjected to filtration through a porous quartz plate at the temperature of 70° C. The slime from the filter is delivered to the stage of a vacuum thermal decomposition of wastes. The content of impurities in the melt of gallium after filtration is as follows: copper-$1.10^{-3}$% by weight, iron-$8.10^{-4}$% by weight, tin-$1.10^{-4}$% by weight, arsenic-$2.10^{-5}$% by weight. The filtered off melt is subjected to a hydrochemical treatment followed the procedure described in Example 1, except that the treatment temperature is 80° C. The content of impurities is as follows: copper-$2.10^{-3}$% by weight, iron-$8.10^{-5}$% by weight arsenic-$8.10^{-5}$% by weight, tin-$2.10^{-4}$% by weight. Then the resulting metallic gallium is subjected to a two-stage fractional crystallization. The process is conducted at the crystallization rate of 2.0 g/min to the crystallization of 80% by mass of the initial gallium melt supplied to each stage of crystallization. The residue after the first stage of crystallization is subjected to the filtration and hydrochemical treatment. The residue enriched with impurities after the second stage is recycled to the 1st stage of crystallization. The content of impurities in the final product is as follows: copper-$2.10^{-6}$% by weight, iron-$2.10^{-5}$% by weight, tin-$6.10^{-6}$% by weight.

EXAMPLE 5

Lump wastes of gallium arsenide with the content of: tin-$2.10^{-1}$% by weight, indium-$4.10^{-1}$% by weight, iron-$2.10^{-2}$% by weight are placed into a graphite crucible which is put into a furnace provided with a condenser. The charge weight is 6 kg.

The reduced pressure of $5.10^{-2}$ mm Hg is created in the chamber and the wastes are heated to the temperature of 900° C. at variable rates of from 12° to 15° C./min, then to the temperature of 1,100° C. at variable rates of from 0.9° to 5° C./min and further to the temperature of 1,150° C. at variable rates of from 10° to 20° C./min. Under these conditions there occur sublimation of arsenic and its condensation. The resulting gallium melt is cooled at variable rates of from 0.05° to 2° C./min to the temperature of 70° C. After cooling the furnace is opened. In the condensor there are 95% of arsenic (based on the initial amount thereof), the degree of recovery of gallium is 90%. Then the melt of gallium is subjected to filtration through a porous quartz plate at the temperature of 70° C. The slime from the filter is delivered to the stage of vacuum-thermal decomposition of wastes. The content of impurities in the gallium melt after filtration is as follows: tin-$5.10^{-3}$% by weight, indium-$2.10^{-3}$% by weight, arsenic-$4.10^{-5}$% by weight. The filtered melt is subjected to a hydrochemical treatment following the procedure described in Example 1 hereinbefore. The content of impurities is as follows: tin-$4.10^{-3}$% by weight, indium-$3.10^{-}$% by weight. Then the resulting metallic gallium is subjected to a three-stage fractional crystallization. The process is conducted at the crystallization rate of 75 g/min to the degree of crystallization of 80% by mass of the starting melt of gallium supplied to every stage of crystallization. The residue after the first stage of crystallization is subjected to a hydrochemical treatment. The metal residues enriched with impurities are delivered from every subsequent stage to the preceding one. The content of impurities in the final product is as follows: tin-not detected, indium-$3.10^{-6}$% by weight.

EXAMPLE 6

Plates of gallium arsenide with an indium-tin solder deposited thereon are placed into a quartz vessel and poured with an aqueous solution of hydrochloric acid in the volumetric ratio between the acid and water equal to 1:1. To this solution of hydrochloric acid there is added an aqueous solution of nitric acid at the volume ratio between nitric acid and water of 1:1. The volume ratio between hydrochloric acid and nitric acid is equal to 1:3. The amount of the employed solution is taken so that it covers the surface of the wastes. The treatment process is conducted for 20 minutes. Then the spent solution is discharged and the wastes are washed with distilled water and then dried at the temperature of 120° C. The treatment duration is 20 minutes. The plates of gallium arsenide after their hydrochemical treatment are subjected to the treatment by the procedure described in Example 4. The content of impurities in the final product is as follows: copper-$2.10^{-6}$% by weight, iron-$2.10^{-5}$% by weight, tin-$6.10^{-6}$% by weight.

EXAMPLE 7

Discarded semiconductor instruments based on gallium arsenide are placed into a quartz vessel and poured with an aqueous solution of hydrochloric acid taken in the volume ratio between the acid and water equal to 1:1. To this solution of hydrochloric acid there is added an aqueous solution of nitric acid at the volume ratio between nitric acid and water equal to 1:1. The volume ratio of hydrochloric acid to nitric acid is 1:3.

The amount of the employed solution is taken so that the wastes' surface is covered with the solution. The treatment process duration is 30 minutes. Then the spent solution is drained and the wastes are washed with distilled water, followed by drying thereof at the temperature of 140° C. The discarded semiconductors based on gallium arsenide with the content of copper of $1.10^{-1}$% by weight, aluminum-$3.10^{-2}$% by weight, indium $1.10^{-1}$% by weight, iron-$2.10^{-2}$% by weight are placed into a graphite crucible which is put into a furnace provided with a condenser. The charge weight is 6 kg.

The reduced pressure of $2.10^{-2}$ mm Hg is created in the chamber and the wastes are heated to the temperature of 900° C. at variable rates of from 5° to 10° C./min, then to the temperature of 1,100° C. at variable rates of from 0.5° to 1° C./min and further to 1,150° C. at variable heating rates of from 5° to 10° C./min. Under these conditions arsenic is sublimed and condensed. The resulting melt of gallium is cooled at variable rates of from 0.05° to 1° C./min to the temperature of 500° C., whereafter the cooling rate is increased to 10°-15° C./min and the melt cooling is continued to the temperature of 100° C. After cooling the furnace is opened. In the condenser there are 92% of arsenic (based on its initial amount), the degree of gallium recovery is 92%. Then the melt of gallium is subjected to filtration through a porous quartz plate at the temperature of 100° C. The slime from the filter is fed to the stage of a vacuum-thermal decomposition of the wastes. The content of impurities in the melt of gallium after filtration is as follows: copper-$2.10^{-1}$% by weight, aluminium-$2.10^{-4}$% by weight, indium-$2.10^{-3}$% by weight, iron-$4.10^{-2}$% by weight, arsenic-$2.10^{-5}$% by weight. The filtered melt is subjected to a hydrochemical treatment following the procedure described in the foregoing Example 1.

The content of impurities is as follows: copper $2.10^{-1}$% by weight, indium-$2.10^{-3}$% by weight, iron-$5.10^{-3}$% by weight. Then the resulting metallic gallium is subjected to a 5 stage fractional crystallization. The process is conducted at the rate of 60 g/min to the degree of crystallization of 70% by mass of the starting gallium melt supplied to every stage of crystallization. The residue after the first crystallization stage is subjected to filtration, hydrochemical treatment and electrolytic refining. The metal residues enriched with impurities from every subsequent stage are supplied to the preceding stage. The content of impurities in the final product is as follows: copper-$2.10^{-6}$% by weight, aluminum-$6.10^{-6}$% by weight, indium $1.10^{-6}$% by weight, iron-$2.10^{-5}$% by weight.

EXAMPLE 8

Lump wastes of gallium arsenide with the content of: tin-$2.10^{-1}$% by weight, silicon-$2.0^{-3}$% by weight, zinc-$3.10^{-2}$% by weight, tellurium-$2.10^{-1}$% by weight are placed into a graphite crucible which is then put into a furnace provided with a condenser. The charge weight is 6 kg. The reduced pressure of $5.10^{-2}$ mm Hg is created in the chamber and the wastes are heated to the temperature of 900° C. at variable rates of from 15° to 20° C./min, then to the temperature of 1,100° C. with variable rates of from 0.5° to 7° C./min and further to the temperature of 1,150° C. at a variable rate of from 5° to 10° C./min. Under these conditions there occur sublimation and condensation of arsenic.

The resulting gallium melt is cooled at a variable rate of from 3° to 10° C./min to the temperature of 500° C., whereafter cooling rates are increased to 12°-15° C./min and the melt is continued to be cooled to the temperature of 85° C. After cooling the furnace is opened. In the condenser there is 94% of arsenic (based on its initial amount), the degree of recovery of gallium is 92%. Then the melt of gallium is subjected to filtration through a porous quartz plate at the temperature of 85° C. The slime from the filter is delivered to the stage of a vacuum-thermal decomposition of wastes. The content of impurities in the gallium melt after filtration is an follows: tin-$2.10^{-3}$% by weight, silicon-$5.10^{-4}$% by weight, zinc-$1.10^{-3}$% by weight, tellurium-$2.10^{-5}$% by weight.

The filtered melt is subjected to a hydrochemical treatment following the procedure described in Example 1, except that the treatment temperature is 80° C. The content of impurities is as follows: tin-$3.10^{-3}$% by weight, silicon-$5.10^{-4}$% by weight, zinc-$5.10^{-5}$% by weight, tellurium-$2.10^{-5}$% by weight.

Then the resulting metallic gallium undergoes a two-stage fractional crystallization. The process is conducted at the crystallization rate of 40 g/min to the crystallization of 60% by mass of the starting gallium melt supplied to the first stage. The residue after the first stage of crystallization is subjected to filtration and hydrochemical treatment. The residue enriched with impurities is fed after the second stage to the first stage of crystallization.

The content of impurities in the final product is as follows: tin-$4.10^{-6}$% by weight, silicon-$2.10^{-5}$% by weight, zinc-$1.10^{-6}$% by weight, tellurium-$4.10^{-6}$% by weight.

EXAMPLE 9

Grinding powders of gallium arsenide without abrasive and with the content of: copper-$6.10^{-3}$% by weight, zinc-$5.10^{-2}$% by weight, tin-$8.10^{-4}$% by weight, silicon-$3.10^{-3}$% by weight are placed into a graphite crucible which is put into a furnace provided with a condenser. The charge weight is 8 kg. The reduced pressure of $1.10^{-1}$ mm Hg is created in the chamber and the wastes are heated to the temperature of 700° C. at variable rates of from 0.5° to 4° C./min, then to the temperature of 1,000° C. at variable rates of from 2° to 5° C./min and further to the temperature of 1,150° C. at variable rates of from 10° to 20° C./min. The resulting gallium melt is cooled at variable rates of from 0.05° to 1° C./min to the temperature 700° C., whereafter cooling rates are increased to the temperature of 5°–15° C./min and the melt is further cooled to the temperature of 50° C. After cooling the furnace is opened. In the condenser there are 96% of arsenic (based on its initial amount, the degree or recovery of gallium is 92%. Then the melt of gallium is subjected to filtration through a porous quartz plate at the temperature of 50° C. The slime from the filter is delivered to the stage of a vacuum-thermal decomposition of wastes. The content of impurities in the melt of gallium after filtration is as follows: copper-$4.10^{-3}$% by weight, zinc-$1.10^{-3}$% by weight, tin-$1.10^{-4}$% by weight, silicon-$1.10^{-3}$% by weight, arsenic-$2.10^{-5}$% by weight.

Futher stages of the hydrochemical treatment of the melt of gallium and fractional purifying crystallization are effected following the procedure described in Example 2.

The content of impurities in the final product is as follows: copper-$2.10^{-7}$% by weight, zinc-$1.10^{-6}$% by weight, tin-$4.10^{-6}$% by weight, silicon-$2.10^{-5}$% by weight.

EXAMPLE 10

Lump wastes of gallium arsenide with the content of: silicon-$3.10^{-3}$% by weight, indium-$2.10^{-1}$% by weight, aluminum-$2.10^{-3}$% by weight are placed into a graphite crucible which is put into a furnace provided with a condenser. The charge weight is 6 kg.

The reduced pressure of $1.10^{-2}$ mm Hg is created in the chamber and the wastes are heated to the temperature of 600° C. at variable rates of from 10° to 12° C./min, then to the temperature of 900° C. at variable rates of from 15° to 20° C./min and further to the temperature of 1,150° C. at variable rates of from 0.5° to 1° C./min. Under these conditions there occur sublimation and condensation of arsenic. The resulting melt of gallium is cooled at variable rates of from 12° to 15° C./min to the temperature of 600° C., whereafter the cooling rate is lowered to 5°–10° C./min and the melt is further cooled to the temperature of 100° C. After cooling the furnace is opened. In the condenser there are 92% of arsenic (based on its initial amount), the degree of recovery of gallium is 86%. Then the gallium melt is subjected to filtration through a porous quartz plate at the temperature of 100° C. The slime from the filter is delivered to the stage of a vacuum-thermal decompositions of wastes. The content of impurities in the melt of gallium after filtration is as follows: indium-$2.10^{-2}$% by weight, aluminum-$2.10^{-4}$% by weight, silicon-$1.10^{-3}$% by weight, arsenic-$3.10^{-5}$% by weight. Further stages of the hydrochemical treatment and fractional crystallization of the melt of gallium are effected following the procedure described in Example 1.

The content of impurities in the final product is as follows: indium-$1.10^{-6}$% by weight, aluminum-$6.10^{-6}$% by weight, silicon-$2.10^{-5}$% by weight.

EXAMPLE 11

Lump wastes of gallium arsenide with the content of: tin-1% by weight, indium-$2.10^{-1}$% by weight, aluminum-$2.10^{-3}$% by weight are placed into a graphite crucible and the latter is put into a furnace provided with a condenser.

The charge weight is 6 kg.

The reduced pressure of $1.10^{-2}$ mm Hg is created in the chamber and the wastes are heated to the temperature of 600° C. at variable rates of from 10° to 15° C./min, then to the temperature of 900° C. at variable rates of from 15° to 20° C./min and then to the temperature of 1,150° C. at variable rates of from 0.5° to 2° C./min. Under these conditions there occur sublimation and condensation of arsenic. The resulting melt is cooled at variable rates of from 0.05° to 3° C./min to the temperature of 400° C., whereafter the cooling rate is increased to 10°–15° C./min and the melt is further cooled to the temperature of 60° C. After cooling the furnace is opened. In the condenser there are 95% of arsenic (based on the initial amount thereof), the degree of recovery of gallium is 89%. Then the melt of gallium is subjected to filtration through a porous quartz plate at the temperature of 60° C. The slime from the filter is supplied to the stage of a vacuum-thermal decomposition. The content of impurities in the melt of gallium after filtration is as follows: tin-$3.10^{-3}$% by weight, indium-$2.10^{-2}$% by weight, aluminum-$1.10^{-4}$% by weight, arsenic-$2.10^{-5}$% by weight. Further stages of the hydrochemical treatment of the melt of gallium and fractional purifying crystallization are carried out following the procedure described in Example 1 hereinbefore.

The content of impurities in the final product is as follows: tin-$6.10^{-6}$% by weight, indium-$1.10^{-6}$% by weight, aluminum-$6.10^{-6}$% by weight.

What is claimed is:

1. A process for producing high-purity gallium from gallium-arsenic-containing wastes resulting from the manufacture of semiconductors comprising:
   a. decomposing said wastes in a vacuum-thermal process under a residual pressure of from $1.10^{-1}$ to $1.10^{-2}$ mm Hg and at a temperature rising from 25° to 1,150° C. on heating at a rate in the range of from 0.5° to 20° C./min, accomplishing sublimation of arsenic and the formation of a melt of gallium containing impurities resulting from the decomposition of said wastes;
   b. condensing said sublimated arsenic;
   c. cooling the melt of gallium obtained by said decomposition of wastes to a temperature of from 50° to 100° C. at a variable rate of from 0.05° to 15° C./min;

d. filtering said gallium melt at the cooling temperature of said melt;

e. hydrochemically treating said filtered melt of gallium;

f. fractionally crystallizing said melt in a multi-stage crystallization to crystallize said gallium;

g. the melt residues enriched with impurities being recycled from each process step to each preceding process step, and whereby from 60 to 95%, by mass, of the starting gallium in each stage is recovered.

2. A process as claimed in claim 1, wherein said vacuum-thermal decomposition of gallium-arsenic-containing wastes resulting from the manufacture of semiconductors is effected first at a temperature of from 25° to 900° C. at heating rates ranging from 5° to 20° C./min, then at a temperature of from 900° to 1,100° C. at heating rates ranging from 0.5° to 10° C./min and further at a temperature of from 1,100° to 1,150° C. at rates ranging from 5° to 20° C./min.

3. A process as claimed in claim 1, wherein cooling of the resulting melt of gallium is effected first to a temperature of from 300° to 500° C. at cooling rates ranging from 0.05° to 15° C./min and then to a temperature of from 50° to 100° C. at cooling rates ranging from 0.5° to 15° C./min.

4. A process as claimed in claim 1, wherein said fractional multi-stage crystallization is carried out in 2 to 5 stages.

5. A process as claimed in claim 1, wherein prior to the vacuum-thermal decomposition the gallium-arsenic-containing wastes are subjected to a hydrochemical treatment comprising treatment of said wastes with an aqueous solution of hydrochloric acid in the presence of an oxidizing agent, followed by washing of the wastes with water and drying thereof at a temperature within the range of from 120° to 160° C.

6. A process as claimed in claim 5, wherein as the oxidizing agent hydrogen peroxide is used.

7. A process as claimed in claim 5, wherein as the oxidizing agent nitric acid is used.

* * * * *